Nov. 12, 1929.   O. E. FISHBURN   1,735,677
SHIFT LEVER MOUNTING FOR AUTOMOBILES
Filed April 23, 1928
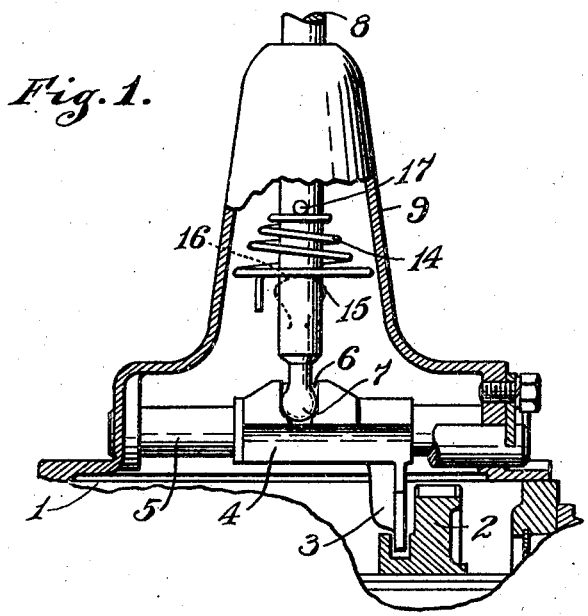
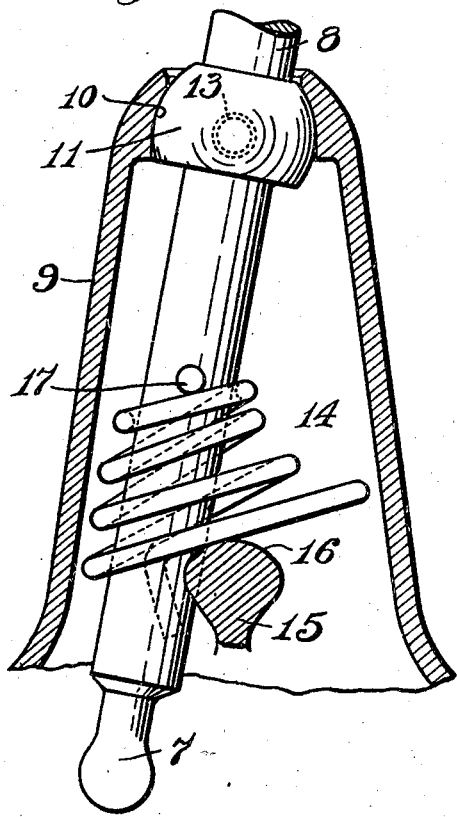
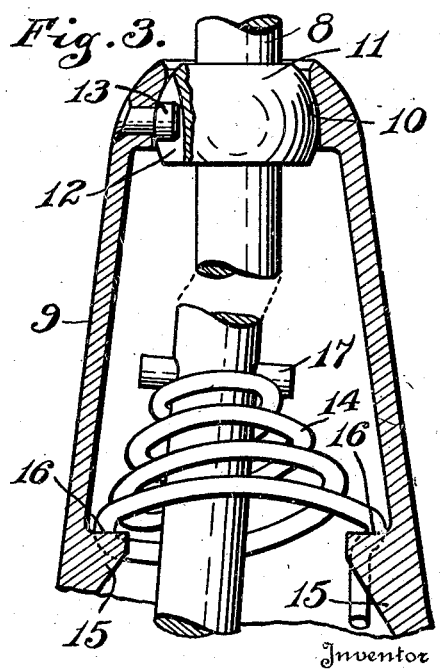
Inventor
Otto E. Fishburn,
By
Hood + Hahn.
Attorneys Patented Nov. 12, 1929

1,735,677

UNITED STATES PATENT OFFICE

OTTO E. FISHBURN, OF MUNCIE, INDIANA, ASSIGNOR TO WARNER GEAR COMPANY, OF MUNCIE, INDIANA, A CORPORATION OF INDIANA

SHIFT-LEVER MOUNTING FOR AUTOMOBILES

Application filed April 23, 1928. Serial No. 272,220.

My invention relates to improvements in mountings for the gear shift levers of automobiles and the like.

It is one of the objects of my invention to provide a gear lever mounting which will prevent rattling or vibration noises in the gear shift lever.

Another object of my invention is to provide a mounting which, when the lever is shifted for the purpose of changing gears, will have a bias toward its shifting position. Another object of my invention is to provide a mounting which will maintain the lever in its shifted position.

For the purpose of disclosing my invention I have illustrated one embodiment thereof in the accompanying drawings, in which—

Fig. 1 is a side elevation partly in section, of a gear shift mounting and associated parts, illustrating my invention;

Fig. 2 is a sectional view showing the lever shifted in one direction;

Fig. 3 is a sectional view looking at the lever mounting in a different direction from that illustrated in Fig. 2.

In the embodiment illustrated the gear casing 1 is of any usual construction and houses the transmission gears, one of which, 2, is illustrated. The gears to be shifted, as is usual in this type of structure, are engaged by a shifting fork 3 mounted on a sliding member 4 in turn slidably mounted on a rod 5. Each of the sliding members is provided with a notch or recess 6 adapted to receive the end 7 of the shift lever 8. This lever is mounted in a conical housing 9 open at its top to permit the lever to pass therethrough and provided with a spherical socket 10 adapted to receive a ball 11 on the lever, which ball and socket mounting prevents the lever from being removed from the housing 9 but at the same time permits a universal movement of the lever so that the lower end may be shifted sideways or backward and forward.

To prevent the lever from rotating axially, the ball 10 is slotted as at 12 to receive a pin 13. The ball is biased in its socketed position by a coiled spring 14 which at its lower end rests on a pair of diametrically opposite lugs 15 preferably rounded at their top as at 16 and integrally formed in the inner side walls of the housing 9. These lugs are arranged in a line extending transversely to the backward and forward line of movement of the lever. The upper end of the spring engages beneath the cross pin 17 which extends through the shift lever and is, when the lever is in normal or neutral position, in vertical alignment with the lugs 15.

As shown in Fig. 1 the shift lever is in its neutral position when extending vertically, and the coil spring is under its greatest compression. When the lever is shifted forward or back the top of the spring moves with the pin 17, rocking on the lugs 15. Due to the expansion action of the spring, as soon as it is shifted slightly off of dead center it tends to move the lower end of the lever in the direction toward which the lower end has been shifted and when the lever reaches the limit of its movement will hold the lever against the abutment with which the lower end engages. In this way vibration of the lever is reduced to the minimum, if not eliminated entirely, due to the fact that the lever is maintained under a spring tension. Furthermore, as soon as the lever has been shifted to throw the spring off of dead center there is an assisting action on the part of the spring in moving the lever in the direction in which it has been shifted and the pressure of the spring is such as to resist any tendency for the shifting fork to move to throw the gears out of mesh.

I claim as my invention:

1. The combination with a hollow pedestal having a dome with an opening formed therein, a tiltable lever adapted to be passed through said opening, a member carried by said lever and engaging said dome, means for yieldingly maintaining said member against said dome and a mounting for said means which causes the same to bias the lever in the direction in which it has been shifted when the lever is moved from normal position either backward or forward.

2. The combination with a hollow pedestal having a dome with an opening formed therein, a tiltable lever adapted to be passed through said opening, means on said lever engaging said dome, a spring supporting said lever and tiltable with the movement of said lever in a direction opposite to that of the lever when the lever is shifted backward or forward.

3. In a device of the character described, the combination with a hollow pedestal having a dome with an opening formed therein, of a tiltable lever adapted to be passed through said opening, means on said lever engaging said dome, a coiled spring surrounding said lever and arranged to maintain said means in engagement with said dome, a support on said dome for said spring on which said spring may rock and a stop member on said lever against which the opposite end of said spring engages and with which said end moves when the lever is shifted backward or forward.

4. In a device of the character described, the combination with a hollow pedestal having a dome with an opening formed therein, of a tiltable lever adapted to pass through said opening, means on said lever engaging said dome and forming a pivot on which said lever is rocked, a coiled spring surrounding said lever, a support on said pedestal on which said lever is rockably mounted, and a stop on said lever engaged by said spring and normally in vertical alignment with said support.

5. In a device of the character described, the combination with a hollow pedestal having a dome with an opening formed therein, a tiltable lever adapted to pass through said opening, a member on said lever engaging said dome and forming a pivot point on which said lever may be swung, a pair of supporting lugs on the inner walls of said pedestal diametrically opposite one another, a stop on said lever normally in vertical alignment with said lugs and a coiled spring interposed between said stop and said lugs.

In witness whereof, I, OTTO E. FISHBURN, have hereunto set my hand at Muncie, Indiana, this 16th day of April, A. D. one thousand nine hundred and twenty-eight.

OTTO E. FISHBURN.